US009465836B2

(12) United States Patent
Zahn et al.

(10) Patent No.: US 9,465,836 B2
(45) Date of Patent: Oct. 11, 2016

(54) ENHANCED BUSINESS OBJECT RETRIEVAL

(75) Inventors: Tobias Zahn, Stuttgart (DE); Holger Schwedes, Kraichtal (DE); Martin Heidel, Walldorf (DE)

(73) Assignee: SAP SE, Walldorf (DE)

( * ) Notice: Subject to any disclaimer, the term of this patent is extended or adjusted under 35 U.S.C. 154(b) by 579 days.

(21) Appl. No.: 12/978,063

(22) Filed: Dec. 23, 2010

(65) Prior Publication Data
US 2012/0166475 A1    Jun. 28, 2012

(51) Int. Cl.
G06F 7/00          (2006.01)
G06F 17/30        (2006.01)

(52) U.S. Cl.
CPC .............. G06F 17/30424 (2013.01)

(58) Field of Classification Search
CPC ................. Y10S 707/99942; G06F 17/30398;
G06F 17/30324; G06N 5/02
USPC ......... 707/745, 803; 712/300; 704/222, 229,
704/256.8; 708/210, 234, 44, 809
See application file for complete search history.

(56) References Cited

U.S. PATENT DOCUMENTS

| 5,848,408 | A  * | 12/1998 | Jakobsson et al. ........... 707/714 |
| 6,226,710 | B1 * | 5/2001 | Melchior ....................... 711/108 |
| 6,687,667 | B1 * | 2/2004 | Gournay ............... G10L 19/087 704/219 |
| 6,931,418 | B1 * | 8/2005 | Barnes .......................... 707/776 |
| 7,020,661 | B1 * | 3/2006 | Cruanes |
| 7,035,843 | B1 * | 4/2006 | Bellamkonda et al. |
| 7,246,124 | B2 * | 7/2007 | Koskas ............. G06F 17/30595 707/737 |
| 7,752,551 | B2 * | 7/2010 | Rosen et al. ................... 715/748 |
| 8,086,641 | B1 * | 12/2011 | Carr .................. G06F 17/30327 707/706 |
| 2003/0004744 | A1 * | 1/2003 | Greene et al. ..................... 705/1 |
| 2004/0024790 | A1 * | 2/2004 | Everett ........................ 707/200 |
| 2004/0172400 | A1 * | 9/2004 | Zarom et al. ................. 707/100 |
| 2004/0215476 | A1 * | 10/2004 | Harvey et al. .................... 705/1 |
| 2004/0225865 | A1 * | 11/2004 | Cox et al. ........................ 712/34 |
| 2004/0249635 | A1 * | 12/2004 | Bennett ........................ 704/222 |
| 2005/0125310 | A1 * | 6/2005 | Hazi et al. ....................... 705/27 |
| 2006/0106835 | A1 * | 5/2006 | Murray et al. ................ 707/100 |
| 2007/0011734 | A1 * | 1/2007 | Balakrishnan ........ H04L 43/026 726/13 |
| 2008/0098046 | A1 * | 4/2008 | Alpern et al. ................. 707/203 |
| 2008/0109437 | A1 * | 5/2008 | Perrizo ............. G06F 17/30592 |
| 2009/0094236 | A1 * | 4/2009 | Renkes ............. G06F 17/30336 |
| 2010/0306412 | A1 * | 12/2010 | Therrien et al. .............. 709/247 |
| 2011/0010358 | A1 * | 1/2011 | Zane et al. .................... 707/714 |
| 2011/0179370 | A1 * | 7/2011 | Cardno et al. ................ 715/771 |
| 2011/0246503 | A1 * | 10/2011 | Bender et al. ................ 707/769 |

* cited by examiner

Primary Examiner — Mariela Reyes
Assistant Examiner — Linh Black
(74) Attorney, Agent, or Firm — Mintz Levin Cohn Ferris Glovsky and Popeo, P.C.

(57) ABSTRACT

A request for at least a portion of a business object is received by a database from a client in a first half of a roundtrip between the client and the database. Each of the tables includes a primary key column and a plurality of records. The primary key column provides, for each record in the table, a primary key for one of a plurality of business objects. Thereafter, the database identifies records within a set of tables among a larger number of tables in the database by matching a primary key associated with the business object with the primary key in the primary key column. Once this identification has been made, the database obtains all values responsive to the request from the identified record and transmits, in a second half of the roundtrip between the client and the database, the obtained values for the business object to the client.

11 Claims, 3 Drawing Sheets

ENHANCED BUSINESS OBJECT RETRIEVAL

TECHNICAL FIELD

The subject matter described herein relates to techniques for retrieving business objects from databases.

BACKGROUND

Business objects contain data stored in different tables within a database. Such a database structure can be used for general-purpose querying while being generally free of certain undesirable characteristics such as insertion, update, and deletion anomalies.

One technique for retrieving business objects from a database is referred to as "retrieve by association". With retrieve by association, each table for a particular business object is separately selected and each such selection requires a full roundtrip between the database server and the requesting client. The business object is then rebuilt on the client side. As an object can consist of over 70 tables, there can be a corresponding number of round-trips (e.g., 70+) to the database server. Optimization techniques cannot be applied in such situations as it is not always clear which tables contains relevant data for the business object. In addition, because of this issue, requests cannot always be parallelized.

FIG. 1 is a diagram 100 illustrating a conventional database structure in which the data of a first level 110 will be requested first. The first level 110 always comprises only one table, namely, the root-table. At this point, all the data from the second level 120 can be requested, with a single request per table. These requests can be performed in parallel. With the data from the second level 120, the data from the third level 130 can be requested, and so forth. As can be appreciated, data from the previous level is always required. Such a cascading arrangement can consume significant resources in connection with data transport as well as client-side processing of the transported data.

SUMMARY

In one aspect, a request for at least a portion of a business object is received by a database from a client in a first half of a roundtrip between the client and the database. The business object includes a plurality of hierarchically arranged values stored across a set of tables in the database. Each of the tables includes a primary key column and a plurality of records. The primary key column provides, for each record in the table, a primary key for one of a plurality of business objects. Thereafter, the database identifies records within the set of tables among a larger number of tables in the database by matching a primary key associated with the business object with the primary key in the primary key column. Once this identification has been made, the database obtains all values responsive to the request from the identified record and transmits, in a second half of the roundtrip between the client and the database, the obtained values for the business object (either the entire business object or the amount requested if less than the entire business object) to the client.

The following describes optional variations which may be implemented singly or in combination depending on the desired configuration. The database can read the set of tables in parallel. The values responsive to the request can be obtained without joining any of the set of tables. The set of tables can include a primary table. The primary table can include bit vector information in a bit vector column that identifies the set of tables among all of the tables stored by the database. The primary key associated with the business object can be identified (when the request does not specify the business object directly) by looking up such primary key from the primary table within the set of tables. The database can be any of a wide variety of databases including relational databases and/or in-memory databases. The transmitting can comprises transmitting either values for the business object or the requested business object with the obtained values.

Articles of manufacture can comprise computer executable instructions permanently stored on computer readable media (e.g., non-transitory media, etc.), which, when executed by a computer, causes the computer to perform operations herein. Similarly, computer systems are also described that may include at least one processor and a memory coupled to the processor. The memory may temporarily or permanently store one or more programs that cause the processor to perform one or more of the operations described herein. For example, a system can include a database and a client (with each having at least one corresponding computer system including at least one processor and memory). In addition, computer-implemented methods are provided in which operations can be executed by one or more data processors (which in turn form parts of one or more computing systems).

The subject matter described herein provides many advantages. For example, the current subject matter allows for at least a portion of a business object to be returned with only a single roundtrip between a client and a database (as opposed to conventional techniques that require one roundtrip per table used to populate the business object).

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
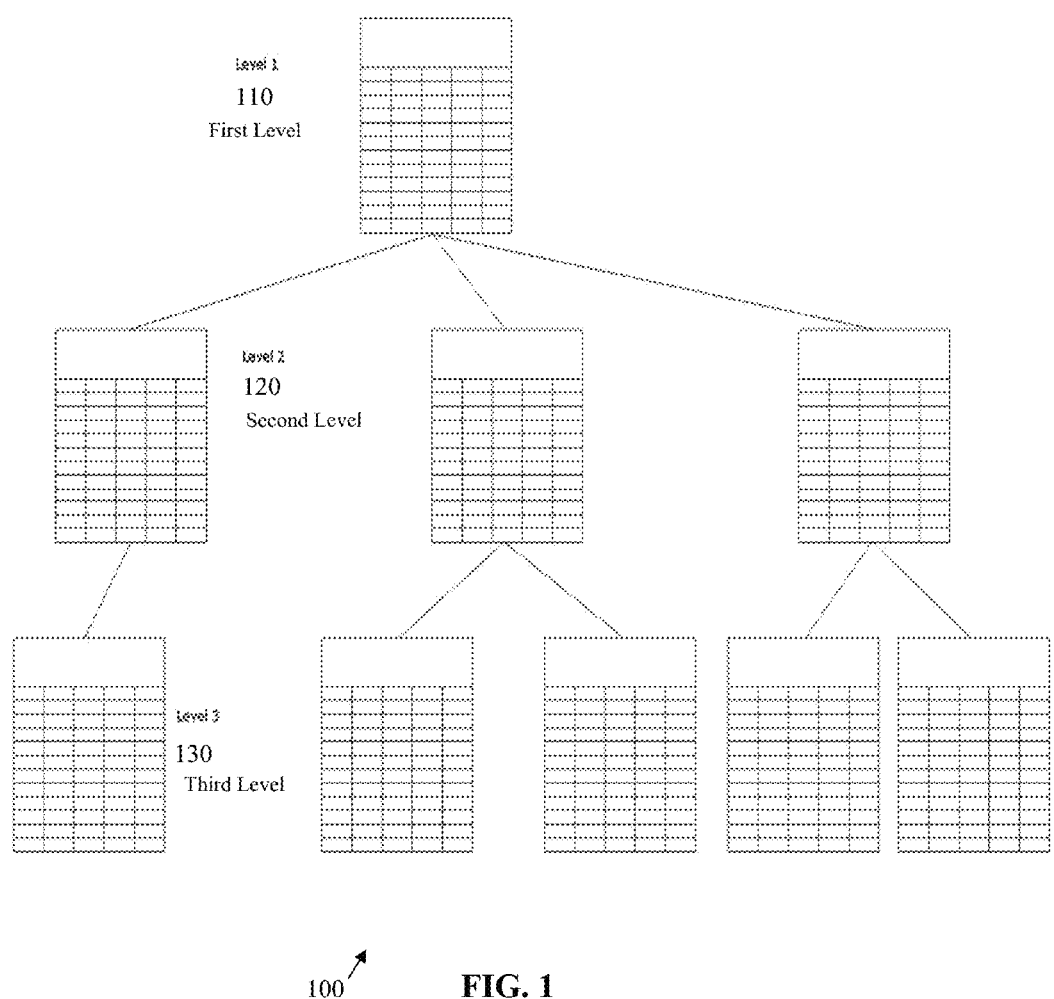
FIG. 1 is a diagram illustrating a conventional set of tables used to retrieve a business object using many roundtrips between a client and a database.
Figure 2:
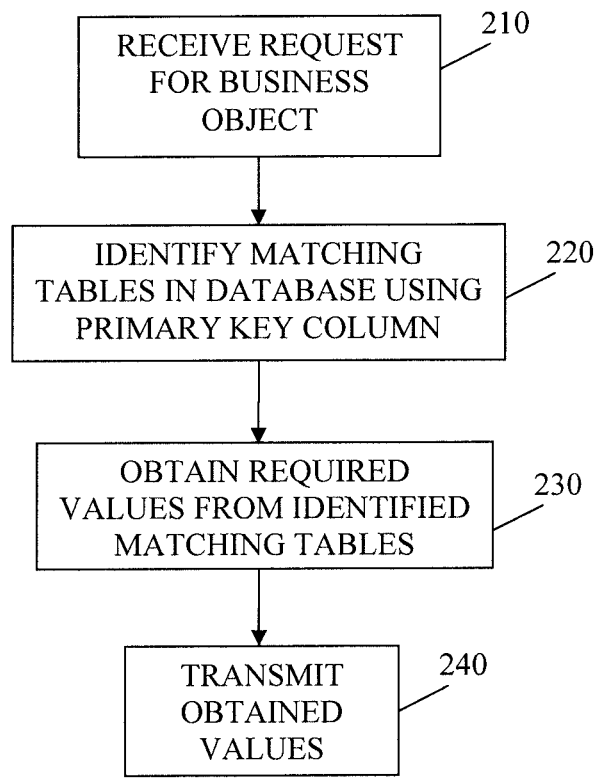
FIG. 2 is a process flow diagram illustrating an enhanced technique for retrieving a business object from a database in a single roundtrip between a client and a database.

FIG. 2 is a process flow diagram illustrating a method 200 in which, at 210, a request for at least a portion of business object is received by a database from a client in a first half of a roundtrip between the client and the database. The business object includes a plurality of hierarchically arranged values stored across a set of tables in the database. Each of the tables includes a primary key column and a plurality of records. The primary key column provides, for each record in the table, a primary key for one of a plurality of business objects. Thereafter, at 220, the database identifies records within the set of tables among a larger number of tables in the database by matching a primary key associated with the business object with the primary key in the primary key column. Once this identification has been made, the database, at 230, obtains all values responsive to the request from the identified record and transmits, at 240, in a second half of the roundtrip between the client and the database, the obtained values for the business object.

The current inventors realized that the optimal way to avoid unnecessary round trips is to have only one roundtrip between the client and the database server per business object request. Therefore, the inventors determined when inventing the current subject matter that requesting each table separately is not an option. Rather, the inventors determined that a request should always return a complete business object (and/or data utilized to populate a business object) containing all the data from all relevant tables.

Figure 3:
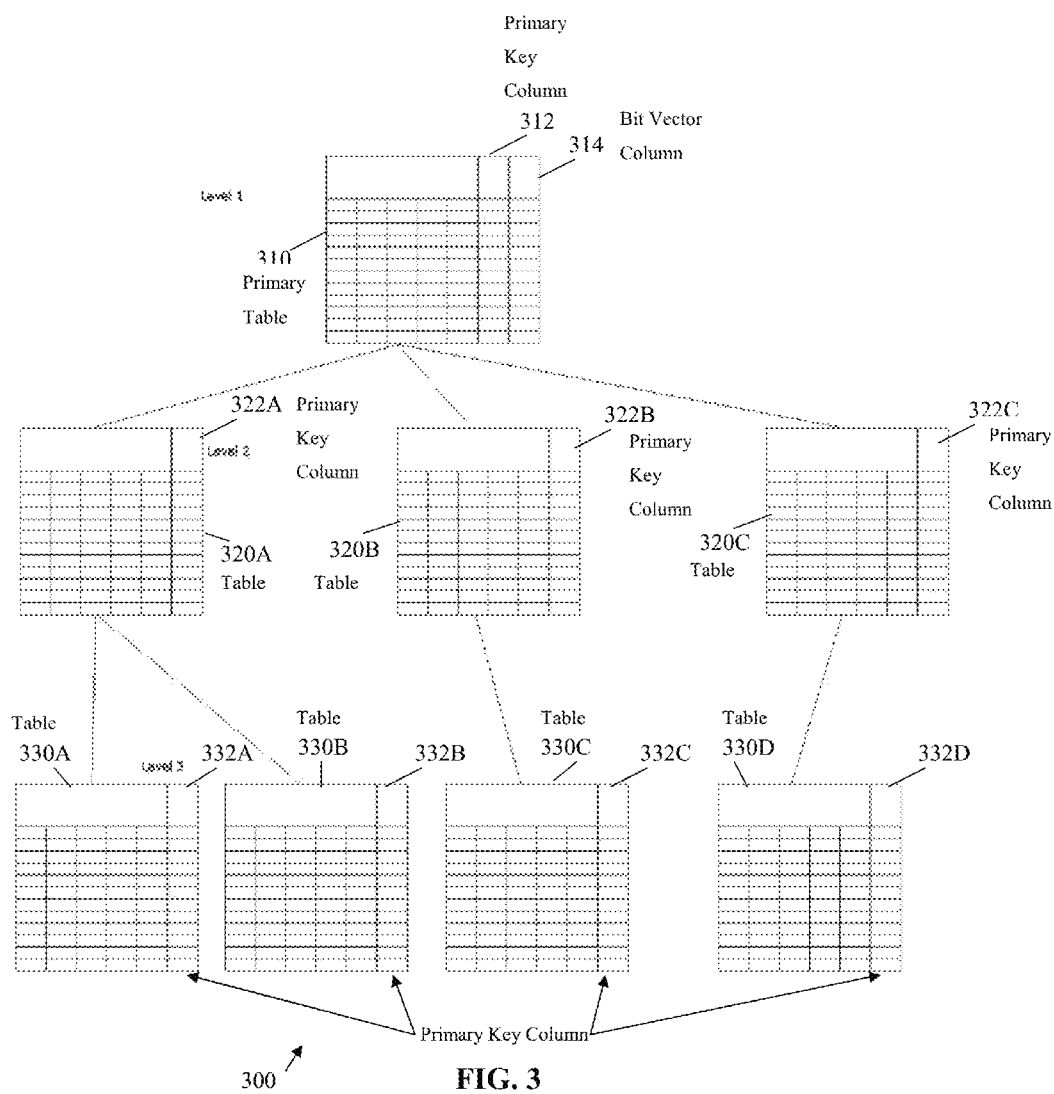
FIG. 3 is a diagram illustrating an arrangement of database tables to implement the technique of FIG. 2.

As illustrated in FIG. 3, a sample database 300 is provided in which each table has an additional column containing the primary key of the object. This database 300 can comprise any of a variety of types of database systems that can be accessed via a remote client. In one implementation, the database 300 is an in-memory database in which all relevant data is kept in a main memory, so read operations can be executed without disk I/O. With such an arrangement, disk based index structures, for example, are not required; however, disk storage is still needed to make changes durable (and required disk write operations occur asynchronously and/or synchronously in the background). In addition, disk storage may be used to store aged data that is no longer needed during normal operations. The database 300 can also provide for columnar organization of data and support parallel execution (which enables some of the features described below).

The database can include a single primary table 310 (i.e., the root-table) having a corresponding primary key column 312 on a first level, three tables 320A-C each having a corresponding primary key column 322A-C on a second level, and four columns 330A-D each having a corresponding primary key column 332A-D on a fourth level. In addition, in some implementations, the table 310 on the first level can have an additional bit vector column 314 as described in further detail below. The additional primary key columns 312, 322A-C, 332A-D contain the primary key for the business object, which in turn can be used to avoid joins which can be computationally expensive and time consuming (as well as not always adequately solving the problems identified herein). Stated differently, the additional column is utilized to identify which records in the tables 310, 320A-C, 330A-D are associated with the business object. The benefit of adding this redundant information is that the data for a given business object can be selected from every table without the need of using joins, and without multiple round trips. The data can directly be found by selecting the data via the primary key of the object. The data can be read from all tables in parallel, too. It will be appreciated that the database table there can be a multitude of tables levels (and not just the three levels illustrated in the diagram 300 of FIG. 3).

If the primary key of the business object is unknown, the primary key is looked up from the primary table 312 first (and as above, the primary key is then used to identify all records in the tables 310, 320A-C, 330A-D). Because such a lookup occurs internally (i.e., it is performed by the database), no extra round-trip between the client and the database server is required. This means, that up on a request for the business object, the database reads all the tables 310, 320A-C, 330A-D on all the levels in parallel, which is a significant enhancement. It reduces the overall processing time as well as the number of round-trips.

A bit vector containing information on which tables are used and which are not can be been added to speed up the process even further. It is stored in the bit vector column 314 in the primary table. Each table 310, 320A-C, 330A-D has a corresponding row, and for each such row one bit is used, it is set if the corresponding table contains data for the business object. This eliminates the need of looking into every table and makes it possible to only query these tables which actually contain data for the object in question. The other tables can be ignored in this case. This arrangement takes into account that not every instance of an object stores data in every table and reading big tables can be quite expensive (from a time and process consumption standpoint).

As stated above, there are cases in which only a portion of a business object is retrieved. In such cases, the processes described herein can be applied to a part of the object tree. For example, the process can start with a table on any level and retrieve all relevant tables from lower levels. The bit vector can be used to provide information about which table contains data and which tables cannot be read from the root-table.

As an example of the benefits of the current subject matter, retrieval/instantiation time was measured for a business object having 6,000 instances. This particular business object consisted of 49 tables and included 700 columns. The business object was retrieved in 93 ms using the retrieve by association techniques. In stark contrast, the same business object was retrieved in 7 ms using the current techniques (sometimes referred to as object skeleton).

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method comprising:
    receiving, by a database from a client in a first half of a roundtrip between the client and the database, a request for at least a portion of a business object, the business object including a plurality of hierarchically arranged values, the values being stored across a set of hierarchical tables in the database, each of the tables including a primary key column and a plurality of records, the primary key column providing, for each record in the table, a primary key for one of a plurality of business objects, the set of tables comprising a primary table including a bit vector column, the bit vector column including bit vector information identifying, at least, the set of tables among all of the tables stored by the database, which of the set of tables contain the values for the business object, and which of the set of tables that cannot be read from the primary table;
    identifying, by the database, records within the set of tables identified by the bit vector column in the primary table, among a larger number of tables in the database by matching a primary key associated with the business object with the primary key in the primary key column;
    obtaining, by the database, all values responsive to the request from the identified records; and
    transmitting, by the database to the client in a second half of the roundtrip between the client and the database, the obtained values for the business object;
    wherein:
        the database reads the set of tables in parallel, excluding the tables identified by the bit vector information as not including the values for the business object;
        the values responsive to the request are obtained without joining any of the set of tables; and
        the values are used at the client to reconstruct the at least a portion of the business object.

2. A method as in claim 1, wherein the primary key associated with the business object is identified by looking up such primary key from the primary table within the set of tables.

3. A method as in claim 1, wherein the database is an in-memory database.

4. A method as in claim 1, wherein the transmitting comprises transmitting the business object with the obtained values.

5. An article of manufacture comprising:
    computer executable instructions stored on non-transitory computer readable media, which, when executed by a computer, causes the computer to perform operations consisting of:
        receiving, by a database from a client in a first half of a roundtrip between the client and the database, a request for at least a portion of a business object, the business object including a plurality of hierarchically arranged values, the values being stored across a set of hierarchical tables in the database, each of the tables including a primary key column and a plurality of records, the primary key column providing, for each record in the table, a primary key for one of a plurality of business objects, the set of tables comprising a primary table including a bit vector column, the bit vector column including bit vector information identifying, at least, the set of tables among all of the tables stored by the database, which of the set of tables contain the values for the business object, and which of the set of tables that cannot be read from the primary table;
        identifying, by the database, records within the set of tables identified by the bit vector column in the primary table, among a larger number of tables in the database, by matching a primary key associated with the business object with the primary key in the primary key column;
        obtaining, by the database, all values responsive to the request from the identified records; and
        transmitting, by the database to the client in a second half of the roundtrip between the client and the database, the obtained values for the business object;
        wherein:
            the database reads the set of tables in parallel, excluding the tables identified by the bit vector information as not including the values for the business object;
            the values responsive to the request are obtained without joining any of the set of tables; and
            the values are used at the client to reconstruct the at least a portion of the business object.

6. An article as in claim 5, wherein the primary key associated with the business object is identified by looking up such primary key from the primary table within the set of tables.

7. An article as in claim 5, wherein the database is a relational database.

8. An article as in claim 5, wherein the transmitting comprises transmitting the business object with the obtained values.

9. A system comprising:
    a database comprising memory and at least one data processor;
    a client comprising memory and at least one data processor, the client being in communication with and remote from the database;
    wherein the database:
        receives a request for at least a portion of the business object from the client in a first half of a roundtrip between the client and the database, the business object including a plurality of hierarchically arranged values, the values being stored across a set of hierarchical tables in the database, each of the tables including a primary key column and a plurality of records, the primary key column providing, for each record in the table, a primary key for one of a plurality of business objects, the set of tables comprising a primary table including a bit vector column, the bit vector column including bit vector information identifying, at least, the set of tables among all of the tables stored by the database, which of the set of tables contain the values for the business object, and which of the set of tables that cannot be read from the primary table;

identifies records within the set of tables identified by the bit vector column in the primary table, among a larger number of tables in the database, by matching a primary key associated with the business object with the primary key in the primary key column;

obtains all values responsive to the request from the identified records; and transmits the obtained values for the business object in a second half of the roundtrip between the client and the database;

wherein the database reads the set of tables in parallel, excluding the tables identified by the bit vector information as not including the values for the business object and wherein the values for the business object are obtained from each of the tables without using joins and without multiple roundtrips between the database and the client;

wherein the at least a portion of the business object includes only a starting table and all tables underneath the starting table in the set of hierarchical tables in the database; and wherein a bit vector provides information identifying which tables contain data for the business object and which of the tables containing the data cannot be read from the starting table.

10. A system as in claim 9, wherein the database is an in-memory relational database storing the values in a main memory so that corresponding read operations can be executed without disk input and output (I/O) operations, and wherein the database provided for columnar organization of data and supports parallel execution.

11. A method as in claim 1, wherein the at least a portion of the business object includes only the primary table and all tables underneath the starting table in the set of hierarchical tables in the database.

* * * * *